United States Patent
Petersen

(10) Patent No.: US 12,479,500 B2
(45) Date of Patent: Nov. 25, 2025

(54) HYDRAULIC STEERING SYSTEM

(71) Applicant: Danfoss Power Solutions ApS, Nordborg (DK)

(72) Inventor: Morten Hoeck Petersen, Rødekro (DK)

(73) Assignee: DANFOSS POWER SOLUTIONS APS, Nordborg (DK)

(*) Notice: Subject to any disclaimer, the term of this patent is extended or adjusted under 35 U.S.C. 154(b) by 135 days.

(21) Appl. No.: 18/469,038

(22) Filed: Sep. 18, 2023

(65) Prior Publication Data
US 2024/0116564 A1    Apr. 11, 2024

(30) Foreign Application Priority Data
Oct. 7, 2022    (EP) ................................. 22200208

(51) Int. Cl.
*B62D 5/093* (2006.01)
*B62D 5/32* (2006.01)

(52) U.S. Cl.
CPC ............... *B62D 5/093* (2013.01); *B62D 5/32* (2013.01)

(58) Field of Classification Search
CPC .......... B62D 5/093; B62D 5/32; B62D 6/007; B62D 5/06; B62D 5/09; B62D 5/08; B62D 5/091
See application file for complete search history.

(56) References Cited

U.S. PATENT DOCUMENTS

| | | | |
|---|---|---|---|
| 4,666,013 A | 5/1987 | Shibahata et al. | |
| 4,834,205 A | 5/1989 | Mizuno et al. | |
| 9,487,232 B2 | 11/2016 | Ohmura et al. | |
| 2005/0038591 A1* | 2/2005 | Michi | B60K 31/0008 701/96 |
| 2007/0163833 A1* | 7/2007 | Kogel | B62D 5/09 180/443 |
| 2020/0114955 A1 | 4/2020 | Hansen et al. | |

FOREIGN PATENT DOCUMENTS

| | | | | |
|---|---|---|---|---|
| CN | 109895845 A | * | 6/2019 | ............ B62D 5/008 |
| EP | 0958990 A2 | | 11/1999 | |
| EP | 1203710 A2 | | 5/2002 | |

OTHER PUBLICATIONS

Image and Translation of CN-109895845, Jun. 18, 2019.*

* cited by examiner

*Primary Examiner* — Carl C Staubach
*Assistant Examiner* — Charles J Brauch
(74) *Attorney, Agent, or Firm* — McCormick, Paulding & Huber PLLC

(57) ABSTRACT

A hydraulic steering system (1) includes a steering command device (2) having a steering sensor (3), a steering motor (6), a wheel sensor (9), a pressure source (P), and control means (12) controlling a fluid supply from the pressure source (P) to the steering motor (6), wherein the control means (12) has an open loop control (19). Such a steering system should have a good relationship between steering input from the operator and steering behaviour of the vehicle to be steered. To this end the control means (12) include in addition to the open loop control (19) a closed loop control (20), wherein cross-over transition means (21) are provided which are connected to the open loop control (19) and to the closed loop control (20) and control a transition between the open loop control (19) and the closed loop control (20).

18 Claims, 2 Drawing Sheets

HYDRAULIC STEERING SYSTEM

CROSS-REFERENCE TO RELATED APPLICATION

This application claims foreign priority benefits under 35 U.S.C. § 119 from European Patent Application No. 22200208.1, filed Oct. 7, 2022, the content of which is hereby incorporated by reference in its entirety.

TECHNICAL FIELD

The present invention relates to a hydraulic steering system comprising a steering command device having a steering sensor, a steering motor, a wheel angle sensor, a pressure source and control means controlling a fluid supply from the pressure source to the steering motor, wherein the control means comprise an open loop control.

BACKGROUND

When a driver actuates the steering command device, for example a steering wheel, then the steered wheels are moved to a position which is related to a steering command from the steering command device. When, for example the steering command device is a steering wheel, then a certain angle of rotation of the steering wheel corresponds to a certain angle of the steered wheels.

Such a steering system comprises an open loop control. The control means can be in form of a hydrostatic steering unit or they can be in form of an electro-hydraulic steering valve. A combination of different control means is possible as well.

Known steering units have play or backlash in its mechanical construction, hydraulic dead band and is also prone to drift of steering wheel vs. wheel angle. In addition, the steering column can contribute to play or backlash.

SUMMARY

The object underlying the present invention is to provide a steering system having a good relationship between steering input from the operator and steering behaviour of the vehicle to be steered.

This object is solved with a hydraulic steering system as described at the outset in that the control means comprise in addition to the open loop control a closed loop control, wherein cross-over transition means are provided which are connected to the open loop control and to the closed loop control and control a transition between the open loop control and the closed loop control.

In such a hydraulic steering system it is possible to use the open loop control of the system under certain conditions and to use the closed loop control under other steering conditions. The transition between the two steering conditions is made by means of the crossover transition means. The cross-over transition means are able to change from the open loop control to the closed loop control or vice versa, in other words, steering strategies take care of separate domains. The cross-over transition means control the transition from one domain to the other so that the transition is done smoothly to avoid sudden changes in the control output. In an open loop control a command from the steering command device leads to a certain amount of hydraulic fluid supplied to the steering motor. In a closed loop control the wheel angle is fed back and the supply of hydraulic fluid to the steering motor is controlled, for example, by an error between the commanded steering angle and the steering angle of the wheels achieved. The transition can be made in a way that an increased part of the closed loop control influences the supply of hydraulic fluid to the steering motor, when changing from open loop control to closed loop control, and by decreasing the part of the closed loop control when changing from the closed loop control to the open loop control.

In an embodiment of the invention the cross-over transition means comprises an input connected to cross-over model means the output of which controls the transition between open loop control and closed loop control. The cross-over model means receive at least one parameter of the vehicle to be steered and "decides" upon this parameter which domain is suitable for the present steering situation of the vehicle, i.e. open loop control or closed loop control. Open loop control does not rely on signals of the wheel angle sensor, so the impact of a fault in the wheel angle sensor is mitigated. Closed loop control improves the reactiveness and precision of the steering response. Thus, the cross-over model means can take the requirements of different steering situations into account.

In an embodiment of the invention the cross-over means are connected to the steering sensor and/or to the wheel angle sensor. The cross-over model means can take into account a steering angle of the steering command device, for example the steering wheel, and/or of the angle of the steered wheels.

In an embodiment of the invention the cross-over model means comprise means for differentiating a signal from the steering sensor and/or from the wheel angle sensor. This makes it possible to take the steering velocity into account for the decision of using open loop control or closed loop control.

In an embodiment of the invention the cross-over model means use closed loop control at low steering speeds and open loop control at high steering speeds. When the rotating speed of the steering wheel is high, open loop control is used and when the velocity of rotation of the steering wheel is low, the closed loop control is used. If appropriate, the same can be used for the wheel angle sensor, i.e. when the wheel angle velocity is high, then the open loop control is used and when the wheel angle velocity is low or when there is no wheel angle velocity the closed loop control is used. In the last case, a drift between the steering command device and the steered wheels can be avoided.

In an embodiment of the invention the cross-over model means are connected to at least one vehicle parameter sensor. The vehicle parameter sensor can detect at least one vehicle parameter, for example, the speed of the vehicle or the underground on which the vehicle moves. This condition can be detected, for example, by a vibration of the vehicle.

In an embodiment of the invention the closed loop control processes an output signal from the wheel angle sensor even when the steering system is operated in open loop control mode. This has the advantage that when a transition occurs between the open loop control and the closed loop control, this transition can be made smooth, so that sudden changes in the steering behaviour can be avoided.

In an embodiment of the invention the cross-over transition means outputs a slew command and is connected to a slew command to flow transducer. Thus, the cross-over transition means do not directly control the flow of hydraulic fluid to the steering motor, but actuates a valve arrangement via the transducer.

In an embodiment of the invention the steering command device is a steering wheel.

In another embodiment the steering command device is a mini wheel or a joystick. In both cases, a transition between open loop control and closed loop control is of advantage.

In an embodiment of the invention the control means comprise at least two control fluid paths between the pressure source and the steering motor. At least one of the fluid paths can be used to perform the closed loop control. Closed loop control is, however, not necessary for all controlled fluid paths.

In an embodiment of the invention one of the control fluid paths comprises a steering unit and another one of the control fluid paths comprises a steering valve. In this case the steering valve can be used for the closed loop control.

In an embodiment of the invention the steering valve is arranged in series with a cut-off valve. This cut-off valve is a safety means.

In an embodiment of the invention at least two of the control fluid paths are arranged in different housings.

In an embodiment of the invention the open loop control includes vehicle speed dependent steering rations. In this case a certain command of the steering command device, for example, a certain angle of rotation of a steering wheel, causes a smaller wheel angle change at higher vehicle speeds than at lower vehicle speeds.

BRIEF DESCRIPTION OF THE DRAWINGS

An embodiment of the invention will now be described with reference to the drawing, wherein.

DETAILED DESCRIPTION

Figure 1:
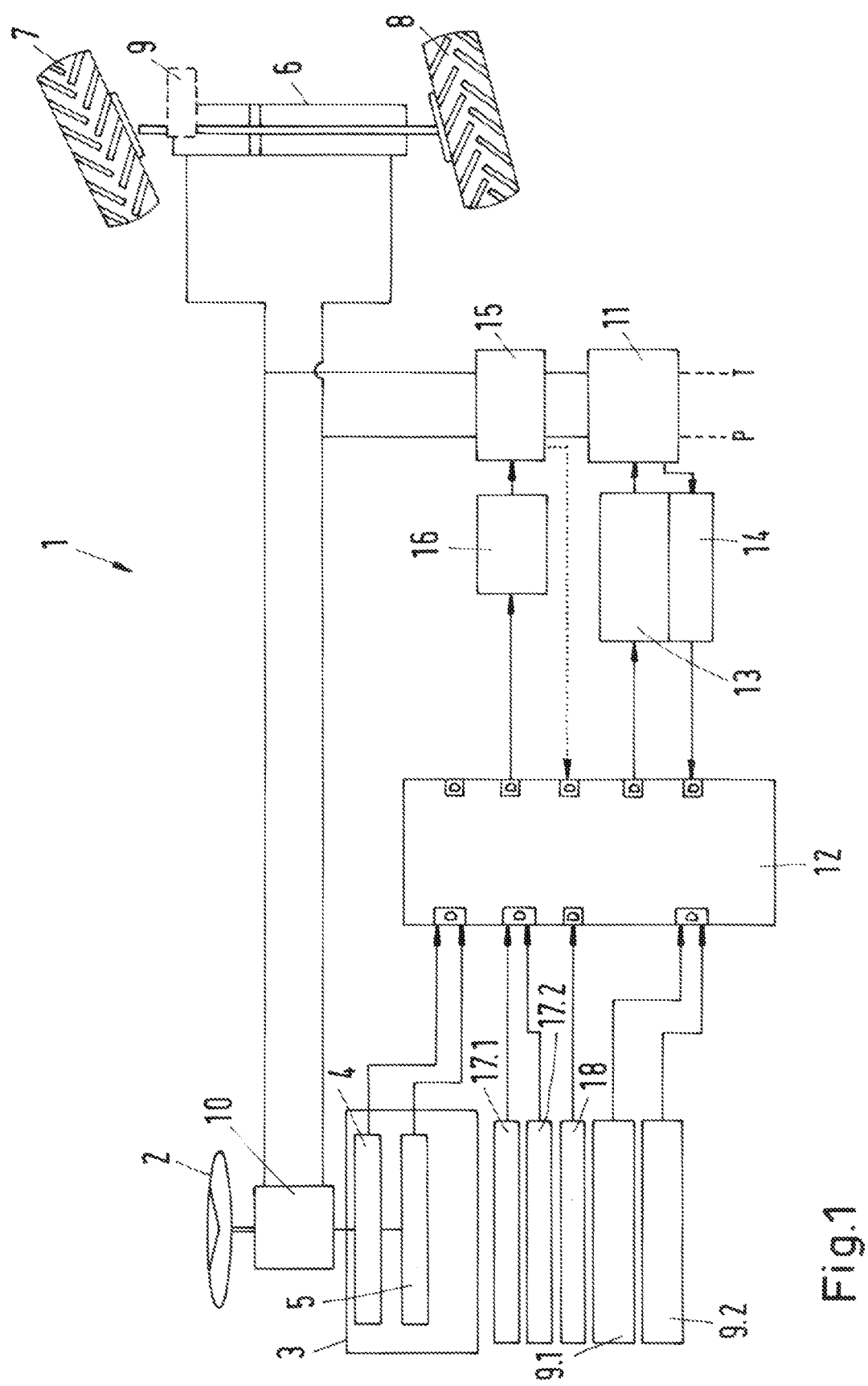
FIG. 1 shows schematically a hydraulic steering system.

FIG. 1 schematically shows a hydraulic steering system 1 having a steering command device 2 in form of a steering wheel. The steering command device comprises a steering sensor 3 which can be provided with two channels 4, 5 and outputs a signal representative of a steering angle, for example, an angle of rotation of a steering wheel. The steering system 1 comprises a steering motor 6 which is connected to steered wheels 7, 8. A wheel sensor 9 is provided which detects an angle of the steered wheels 7, 8. A pressure source P is provided to supply hydraulic fluids, for example oil, to the steering system 1. The hydraulic fluid is returned to a tank port T.

In the present case the steering system 1 comprises two controlled fluid paths between the pressure source P and the steering motor 6. One of the fluid paths comprises a steering unit 10, which can be, for example, a hydrostatic steering unit. Such a hydrostatic steering unit comprises a sleeve having a number of channels and openings, and which is arranged rotatably within a bore of a housing. A spool having another arrangement of openings is arranged rotatably within the sleeve. One of sleeve and spool is connected to the steering wheel 2 and the other is connected to a measuring motor. When the steering wheel 2 is rotated, the sleeve is rotated with respect to the spool and sleeve and spool together open some orifices and close others. A flow of fluid from the pressure source P to the steering motor 6 flows through these orifices and actuates at the same time the measuring motor which restores the spool back to a neutral position in relation to the sleeve once the necessary amount of hydraulic fluid has been supplied to the steering motor 6. Such a steering unit is known in the art and is available from Danfoss Power Solutions ApS, Nordborg, Denmark, for example as steering unit "OSP".

A second fluid path of the steering system comprises an electro-hydraulic steering valve 11 which is controlled by control means 12 via a solenoid valve bridge 13. The electro-hydraulic steering valve 11 is connected to a position sensor 14 so that the solenoid valve bridge 13 can precisely control the opening degree of the electro-hydraulic valve 11.

The electro-hydraulic valve 11 is connected to the steering motor 6 by means of a cut-off valve 15 which in turn is controlled by a solenoid valve 16.

The control means 12 are connected to the steering sensor 3 and to the wheel angle sensor 9 having two channels 9.1, 9.2. Furthermore, a first vehicle speed sensor 17.1 and a second vehicle speed sensor 17.2 and an auto-guidance 18 optionally can be provided, so that the vehicle can be driven under control of GPS.

Such a hydraulic system is known per se and is available under OSPE from Danfoss Power Solutions ApS, Nordborg, Denmark.

The control means 12 now use a new control strategy. This control strategy is illustrated with reference to FIG. 2. Elements in all Fig. are denoted with the same reference numerals.

The control means 12 comprise an open loop control 19 and in addition a closed loop control 20. The open loop control 19 and the closed control loop 20 are connected to the steering sensor 3.

The open loop control 19 supplies a certain amount of hydraulic fluid to the steering motor 6 when the steering command device 2 is actuated. The closed loop control 20 uses in addition a feedback signal from the wheel angle sensor 9 and controls the supply of hydraulic fluid to the steering motor 6, for example, depending on an error between a set-value commanded by the steering command device 2 and the wheel angle sensor achieved.

The open loop control 19 comprises an output which is connected to cross-over transition means 21. The closed loop control 20 is connected to the wheel angel sensor 9 and comprises an output which is connected to the cross-over transition means 21. Thus, the cross-over transition means 21 can control which of the two control modes (open loop control or closed loop control) is appropriate to be used for steering the vehicle to be steered.

The cross-over transition means 21 causes a transition from the open loop control 19 to the closed loop control 20 by decreasing the proportion of the open loop control 19 and increasing the proportion of the closed loop control 20. This is schematically shown in the dashed rectangle. The same is true for a transition between the closed loop control 20 and the open loop control 19. In this case, the cross-over transition means 21 causes a transition from the closed loop control 20 to the open loop control 19 by decreasing the proportion of the closed loop control 20 and increasing the proportion of the open loop control 19, wherein in each case the proportion is a proportion of the hydraulic fluid supplied to the steering motor 6.

The cross-over transition means 21 comprise an input which is connected to crossover model means 22. The cross-over model means 22 are connected to an output of the steering sensor 3.

The cross-over model means 22 receive a signal from the steering sensor 3 indicating the desired steering angle. When, for example, the steering command device 2 is a steering wheel, then the steering sensor 3 detects the angle of the steering wheel and outputs a steering angle signal.

In a way not shown the cross-over model means 22 can also be connected to the wheel angle sensor 9 thus receiving a signal about the wheel angle.

In both cases the cross-over model means 22 can have means for differentiating a signal from the steering sensor 3 or of the wheel angle sensor 9. The cross-over model means 22 is thus able to detect the steering speed and can control the cross-over transition means 21 depending on the steering speed. However, this is one of a plurality of possibilities to control the cross-over transition means 21.

The cross-over model means 22 control the cross-over transition means 21 in a way, for example, that closed loop control 20 is used at low steering speeds or at no steering speed and open loop control 19 is used at high steering speeds.

The cross-over transition means 21 are connected to a slew command to flow command transducer 23. This transducer 23 outputs a signal controlling the solenoid valve bridge 13 of the electro-hydraulic valve 11.

In order to allow for a smooth transition from open loop control 19 to closed loop control 20 the closed loop control 20 processes an output signal from the wheel angle sensor 9 even when the steering system, for example, is operated in open loop control mode. Thus, there is no sudden change in the steering behaviour when transition is made.

Figure 2:
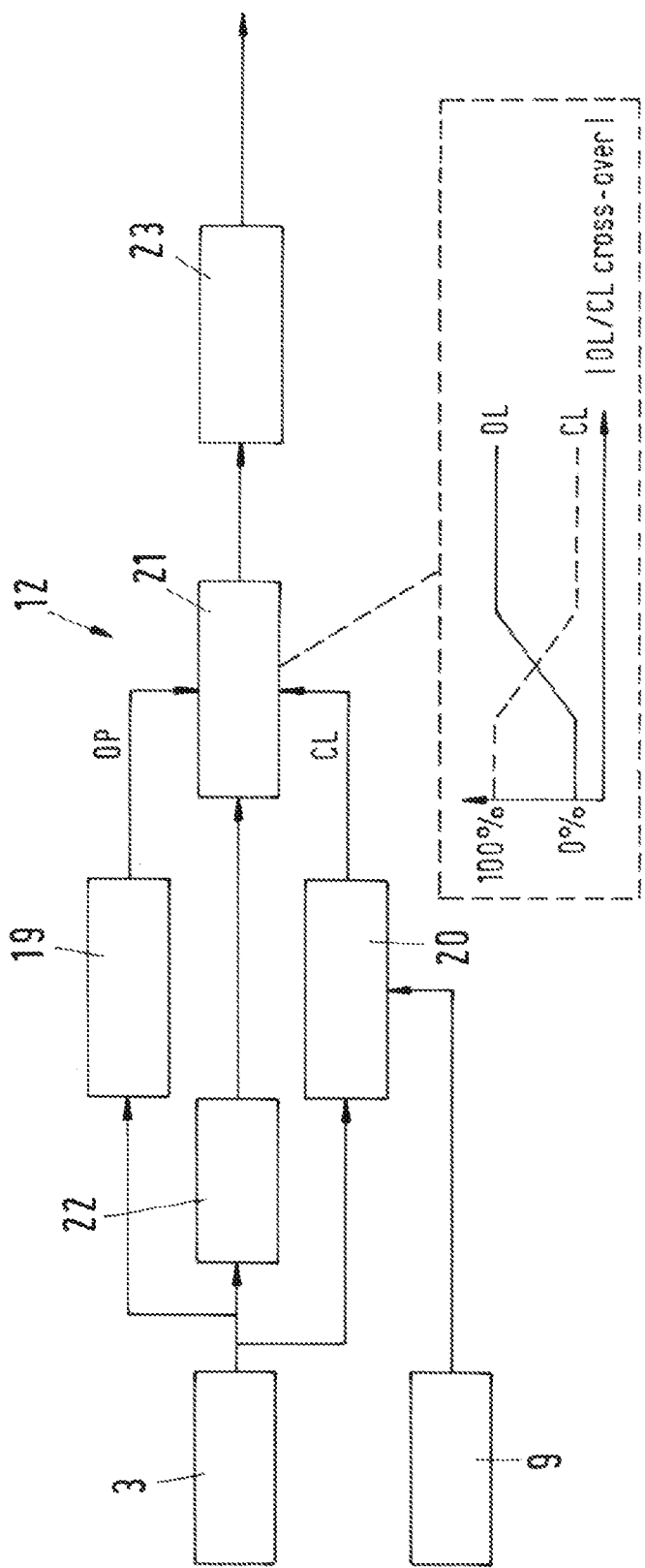
FIG. 2 shows schematically the way how the different control strategies are realized.

In a way not shown in FIG. 2 but in FIG. 1 the cross-over model means can be connected to at least one vehicle parameter sensor, for example the vehicle speed sensors 17.1, 17.2 or to the auto-guidance 18. In this case the cross-over model means 22 can use additional vehicle parameters for commanding the transition between open loop control 19 and closed loop control 20, for example the speed of the vehicle or the fact that the vehicle is steered automatically by GPS. Other sensors are possible. It is, for example possible to detect whether the vehicle drives on a road or in the field.

The two controlled fluid paths can be arranged in the same housing. However, they can also be arranged in different housings. One housing comprises the steering unit 10 and the other housing comprises the electro-hydraulic valve 11 and the means for controlling this electro-hydraulic valve 11.

When, for example, the steering command device 2 is a mini wheel or a joystick, only the path comprising the electro-hydraulic steering valve 11 is used. It is, however, possible in this case to use two controlled fluid paths in parallel, each having an electro-hydraulic steering valve 11.

In such a hydraulic steering system 1 the closed loop control 20 can be used to eliminate a drift between the steering command device 2 and the steered wheels 7, 8. Further, the reactiveness of the hydraulic steering system 1 can be optimized.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering system comprising a steering command device having a steering sensor, a steering motor, a wheel angle sensor, a pressure source, and control means controlling a fluid supply from the pressure source to the steering motor, wherein the control means comprise an open loop control, wherein the control means comprise in addition to the open loop control a closed loop control, wherein cross-over transition means are provided which are connected to the open loop control and to the closed loop control and control a transition between the open loop control and the closed loop control.

2. The hydraulic steering system according to claim 1, wherein the cross-over transition means comprise an input connected to cross-over model means the output of which controls the transition between open loop control and closed loop control.

3. The hydraulic steering system according to claim 2, wherein the cross-over model means are connected to the steering sensor and/or to the wheel angle sensor.

4. The hydraulic steering system according to claim 3, wherein the cross-over model means comprise means for differentiating a signal from the steering sensor and/or from the wheel angle sensor.

5. The hydraulic steering system according to claim 4, wherein the cross-over model means use closed loop control at low steering speeds and open loop control at high steering speeds.

6. The hydraulic steering system according to claim 2, wherein the cross-over model means are connected to at least one vehicle parameter sensor.

7. The hydraulic steering system according to claim 1, wherein the closed loop control processes an output signal from the wheel angle sensor even when the steering system is operated in open loop control mode.

8. The hydraulic steering system according to claim 1, wherein the cross-over transition means outputs a slew command and is connected to a slew command to flow command transducer.

9. The hydraulic steering system according to claim 1, wherein the steering command device is a steering wheel.

10. The hydraulic steering system according to claim 1, wherein the steering command device is a mini wheel or a joystick.

11. The hydraulic steering system according to claim 1, wherein the control means comprise at least two controlled fluid paths between the pressure source and the steering motor.

12. The hydraulic steering system according to claim 11, wherein one of the controlled fluid paths comprises a steering unit and another one of the controlled fluid paths comprises a steering valve.

13. The hydraulic steering system according to claim 12, wherein the steering valve is arranged in series with a cut-off valve.

14. The hydraulic steering system according to claim 11, wherein at least two of the controlled fluid paths are arranged in different housings.

15. The hydraulic steering system according to claim 1, wherein the open loop control includes vehicle speed dependent steering ratios.

16. The hydraulic steering system according to claim 3, wherein the cross-over model means are connected to at least one vehicle parameter sensor.

17. The hydraulic steering system according to claim 4, wherein the cross-over model means are connected to at least one vehicle parameter sensor.

18. The hydraulic steering system according to claim 5, wherein the cross-over model means are connected to at least one vehicle parameter sensor.

* * * * *